United States Patent [19]

Takiguchi et al.

[11] Patent Number: 5,405,672
[45] Date of Patent: Apr. 11, 1995

[54] WATER-PROOF STRUCTURE FOR AUTOMOBILE DOOR

[75] Inventors: Shuji Takiguchi; Yasuyoshi Serizawa; Yoshihito Aoki; Satoru Unno, all of Susono, Japan

[73] Assignee: Yazaki Corporation, Tokyo, Japan

[21] Appl. No.: 241,408

[22] Filed: May 11, 1994

[30] Foreign Application Priority Data

May 13, 1993 [JP] Japan .................................. 5-111685
Sep. 13, 1993 [JP] Japan .................................. 5-226900
Jan. 31, 1994 [JP] Japan .................................. 6-009539

[51] Int. Cl.$^6$ ........................ B62D 25/00; B32B 3/30
[52] U.S. Cl. ..................................... 428/119; 428/138;
428/161; 428/194; 296/146.5; 296/146.9;
296/146.11; 16/232; 49/489.1
[58] Field of Search ............... 428/119, 138, 161, 194;
296/146.5, 146.9, 146.11; 16/232; 220/3.5;
49/489.1

[56] References Cited
FOREIGN PATENT DOCUMENTS

62-54849  4/1987  Japan .

Primary Examiner—Alexander S. Thomas
Attorney, Agent, or Firm—Armstrong, Westerman, Hattori, McLeland & Naughton

[57] ABSTRACT

This invention is intended to ensure complete water-proof sealing between a fixture of a wire harness and a door frame and between a weather strip and the fixture and/or a door frame at a draw-out part of a door wire harness for an automobile door and prevent ingress of water from outside into the automobile cabin. An L-shaped recess (B) is formed across a side plate part (A1) to an inner plate part (A2) at a hinge fitting side of a door frame (A) of an automobile, a connector through hole (2) is formed in a main plate part (1) of an L-shaped fixture (D) which covers the L-shaped recess (B) and a weather strip guideway (3) is formed on the surface of the main plate part (1). Simultaneously, a cutaway part (3b) and a tapered abutment part (3a), which terminates in the cutaway part (3b), are provided at both ends of the weather strip guideway (3b), a water-proof packing (E) is provided on the periphery of the internal surface of the main plate part (1) and part of the water-proof packing is disposed to face the cutaway part 3b.

8 Claims, 8 Drawing Sheets

WATER-PROOF STRUCTURE FOR AUTOMOBILE DOOR

BACKGROUND OF THE INVENTION

1. Field of the Invention

This invention relates to a water-proof structure of a guide end part for connecting a door wire harness to be used at a hinge fitting side of an automobile door.

2. Description of the Prior Art

An L-shaped recess is formed across a side plate part and an inner plate part at a hinge fitting side of a door frame and an access hole is provided on the inner plate part. A door wire harness for an automobile door is arranged inside the door frame through the access hole and the guide end part for connection to a vehicle body is supported by an L-shaped fixture and further guided outwardly through the L-shaped fixture which is fixed on the L-shaped recess.

Though a weather strip for preventing water from entering into a vehicle cabin is attached as a sealing member to the outer periphery of the door frame, a clearance is apt to be formed between the L-shaped fixture and the weather strip and water may enter into the vehicle cabin through this clearance.

For fixing the L-shaped fixture to the L-shaped recess of the door frame, it is necessary to change the dimensions and shape of the L-shaped fixture in accordance with such factors as the shape, reducing depth and bending radius of the L-shaped recess and it is extremely difficult to complete water proofing between the L-shaped fixture and the L-shaped recess.

SUMMARY OF THE INVENTION

This invention has been accomplished to overcome the above drawback and its object is to attain water proofing between an L-shaped fixture and a weather strip and also between fitting members such as the L-shaped fixture and an L-shaped recess and a door frame.

In order to attain the object, according to an aspect of this invention, there is provided a water-proof structure for an automobile door comprising an L-shaped recess which is formed across a side plate part to an inner plate part at a hinge fitting side of a door frame of an automobile, a connector through hole which is formed in a main plate part of an L-shaped fixture which covers the L-shaped recess, and a weather strip guideway which is formed on the surface of the main plate part, wherein the weather strip guideway is provided with a cutaway part and a tapered abutment part, which terminates in the cutaway part, at its both ends, the main plate part is provided with a water-proof packing on a periphery of its internal surface, part of the water-proof packing is disposed to face the cutaway part, a weather strip is arranged from the weather strip guideway of the L-shaped fixture, which is fixed to the door frame, onto the door frame whereby the water-proof packing, which is compressed when the door of the vehicle is closed, serves to fill a clearance between the weather strip and the L-shaped fixture and the door frame.

According to another aspect of this invention, there is provided a water-proof structure for an automobile door comprising an L-shaped recess which is formed across a side plate part to an inner plate part at a hinge fitting side of a door frame of an automobile, a connector through hole which is formed in a main plate part of an L-shaped fixture which covers the L-shaped recess, and a weather strip guideway which is formed on the surface of the main plate part, wherein the weather strip guideway is provided with a cutaway part and a tapered engaging member, which terminates in the cutaway part, at its both ends, the main plate part is provided with a water-proof packing on a periphery of its internal surface, a tapered abutment part, which declines from an internal raised part formed on the water-proof packing toward outside, is disposed to face the cutaway part to cause an engaging recess formed on an end surface of the raised part to be engaged with the tapered engaging member, and a weather strip is arranged from the weather strip guideway of the L-shaped fixture, which is fixed to the door frame, onto the door frame whereby the water-proof packing, which is compressed when the door of the vehicle is closed, serves to fill a clearance between the weather strip and the L-shaped fixture and the door frame.

According to a further another aspect of this invention, there is provided a water-proof structure for an automobile door comprising an L-shaped recess which is formed across a side plate part to an inner plate part at a hinge fitting side of a door frame of an automobile, a connector through hole which is formed in a main plate part of an L-shaped fixture which covers the L-shaped recess, and a weather strip guideway which is formed on the surface of the main plate part, the weather strip guideway being provided with a cutaway part at its both ends and the main plate part being provided with a water-proof packing on the periphery of its internal surface, wherein an arc-shaped weather strip abutment member is continuously formed on the water-proof packing and the water-proof packing is coupled to the L-shaped fixture to position the weather strip abutment member in the weather strip guideway.

According to a further another aspect of this invention, there is provided a water-proof structure for an automobile door comprising a connector through hole which is provided in a fitting plate part of a fixture, an accommodating groove which is provided on the internal surface of the fitting plate part to reach from the connector through hole to an open end, an under cover which is fixed in the accommodating groove while a strap part of a door wire harness is accommodated in the accommodating groove, and a weather strip guideway which is formed on the surface of the fitting plate part, wherein a cutaway part and a tapered abutment part, which terminates at the cutaway part, are provided at both ends of the weather strip guideway, a water-proof packing is provided on the periphery of the internal surface of the fitting plate part, part of the water-proof packing is disposed to face the cutaway part, and a weather strip is arranged from the weather strip guideway of the fixture, which is fixed to the door frame, onto the door frame whereby the water-proof packing, which is compressed when the door of the vehicle is closed, serves to fill a clearance between the weather strip and the fixture and the door frame.

As described above, this invention provides an effect that the water-proof packing applied to the cutaway part of the L-shaped fixture is forced by the weather strip to be arranged in position to fill the clearance between the L-shaped fixture and the door frame.

DETAILED DESCRIPTION OF PREFERRED EMBODIMENTS

In FIGS. 1 to 4, character A denotes a door frame on which an L-shaped recess B is formed ranging from a side plate part A1 and an inner plate part A2 at a hinge fitting side of the door frame. C denotes a door wire harness which is guided outwardly from the L-shaped recess B through an L-shaped fixture D.

Figure 1:
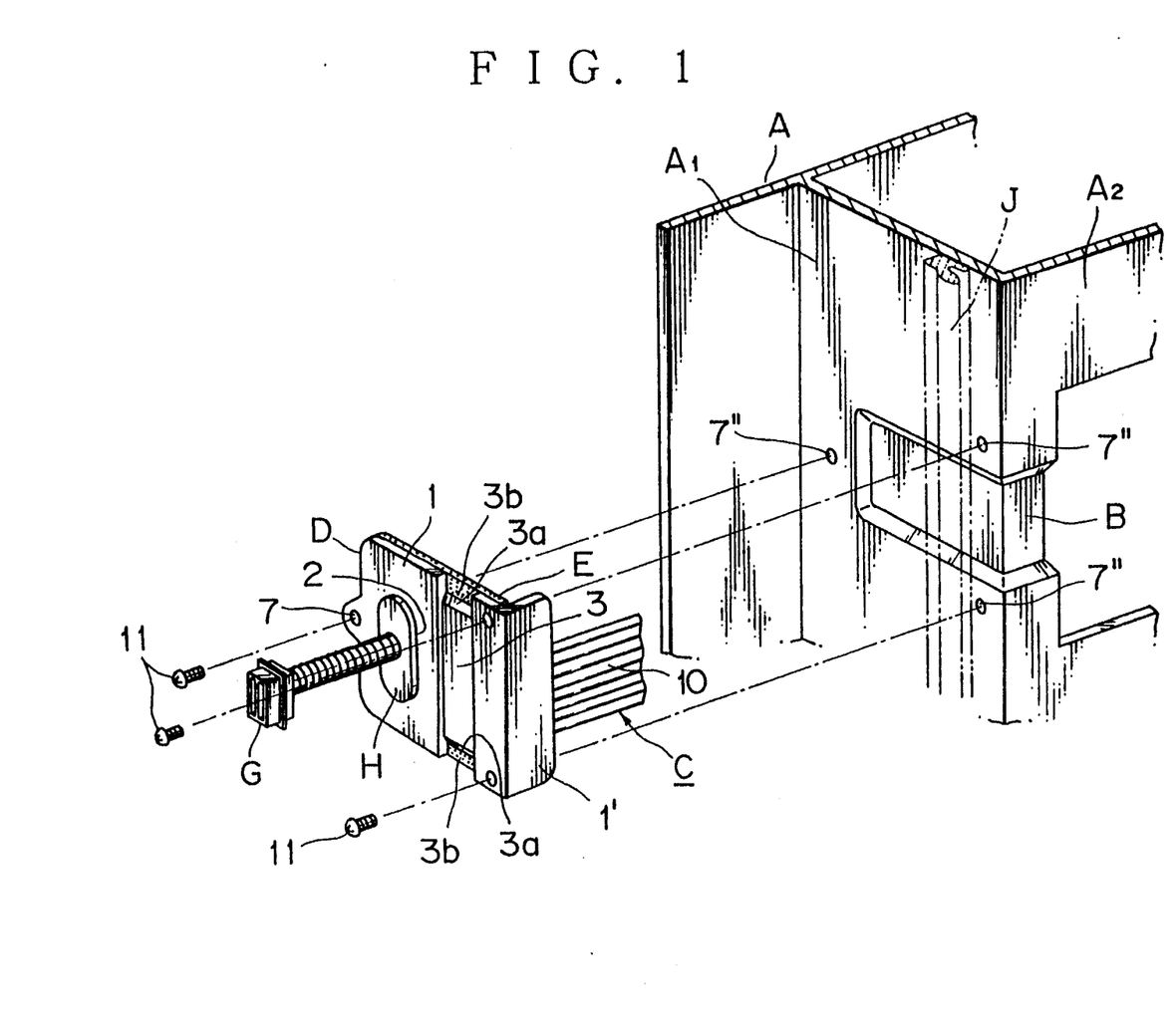
FIG. 1 is a perspective view of an L-shaped fixture before installation according to one embodiment of this invention.
Figure 2:
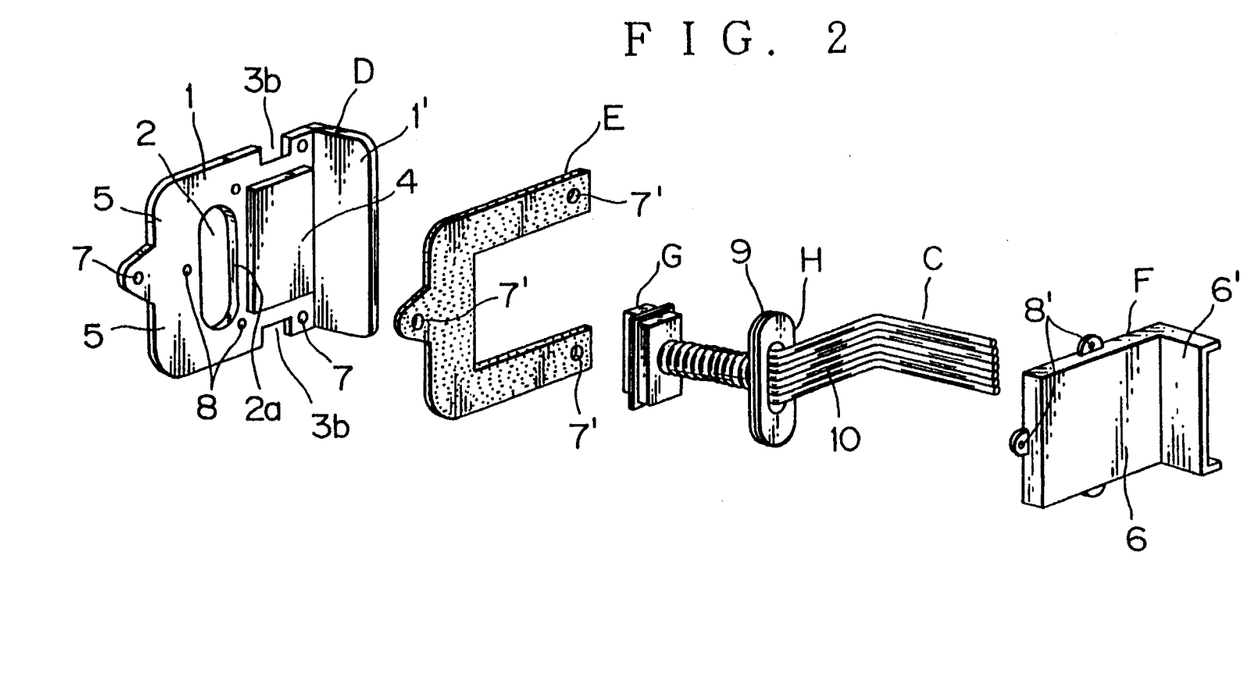
FIG. 2 is a disassembled perspective view of the L-shaped fixture part.

A bent upright plate member 1' is provided at one side of a main plate part 1 of the L-shaped fixture D, the main plate part 1 is provided with a connector through hole 2 and a weather strip guideway 3, and tapered abutment parts 3a, 3a are formed at both sides of the weather strip guideway 3. Thickness 11 of the end of the tapered abutment part 3a is 0.5 mm and thickness 12 of the part of the weather strip guideway 3 is 1.0 mm (see FIG. 4). Cutaway parts 3b, 3b are formed outside the tapered abutment parts 3a, 3a at both ends of the weather strip guideway 3 and reinforcing ribs 4 are internally provided.

An approximately U-shaped bond layer 5 is formed on the internal surface of the main plate part 1 and an approximately U-shaped water-proof packing E made of a semi-continuous foamed sealing material is prepared corresponding to the bond layer 5. F denotes an under cover which comprises a main plate part 6 corresponding to the main plate part 1 of the L-shaped fixture D and an upright plate part 6'.

Fitting holes 7, 7' and 7" are formed at the corresponding positions of the main plate part 1, water-proof packing E and side plate part A1, and coupling holes 8 and 8' are formed on the internal surface of the main plate part 1 and the main plate part 6 of the under cover F.

The water-proof packing E is fitted in advance to the internal surface of the main plate part 1 of the L-shaped fixture D, a main connector G provided at the end of the door wire harness C, which is arranged inside the door frame A and led out from the L-shaped recess B, is drawn out from the through hole 2, an outer periphery 9 of a sealing member H is engaged with an inner periphery 2a of the connector through hole 2, and a strap part 10 of the door wire harness C is arranged while being bent along the upright plate part 1' whereby the door wire harness C is fixed by the under cover F with screws in coupling holes 8, 8'.

The L-shaped fixture D assembled as described above is applied from the side plate part A1 of the door frame A to the inner plate part A2 so as to cover the L-shaped recess B and fixed to the door frame A with screws 11 through fitting holes 7, 7' and 7". In this case, the tapered abutment parts 3a, 3a engage in the water-proof packing E (see FIG. 4).

Figure 4:
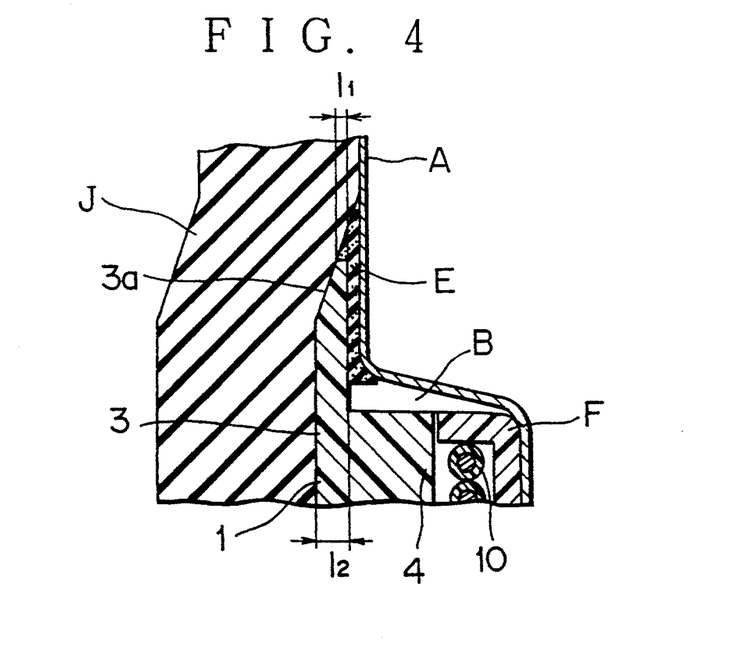
FIG. 4 is a sectional view of the L-shaped fixture part after installation.

Then, a weather strip J is arranged on the L-shaped fixture D while being positioned in the weather strip guideway 3 and a clamp J1 is engaged for fixing with a fitting hole 12 of the door frame. When the door is closed, the weather strip J receives a pressure to depress the water-proof packing E which is protruded from the tapered abutment part 3a of the weather strip guideway 3 and the water-proof packing E is provided to eliminate a clearance in the range from the tapered abutment part 3a to the surface of the door frame A.

In FIGS. 5 to 8, an L-shaped fixture D' is combined with a water-proof packing E'.

Figure 5:
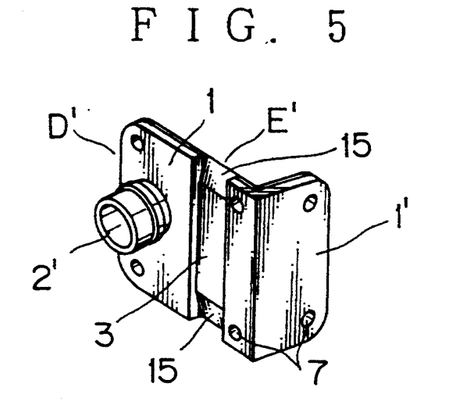
FIG. 5 is a perspective view showing another structure of the L-shaped fixture which is coupled with a water-proof packing.
Figure 6:
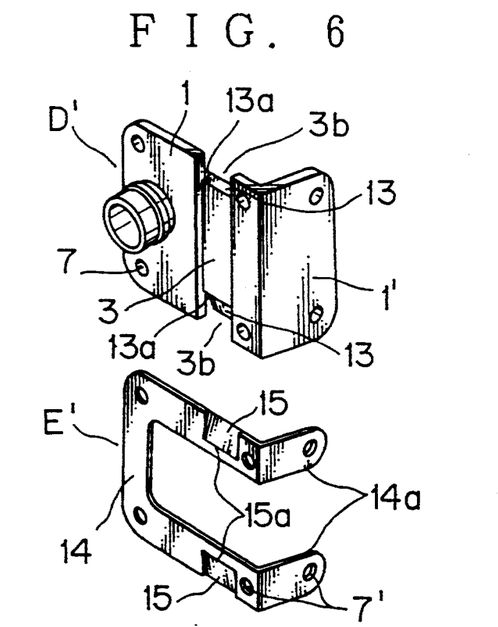
FIG. 6 is a perspective view of the L-shaped fixture and the water-proof packing, shown separated.
Figure 7:
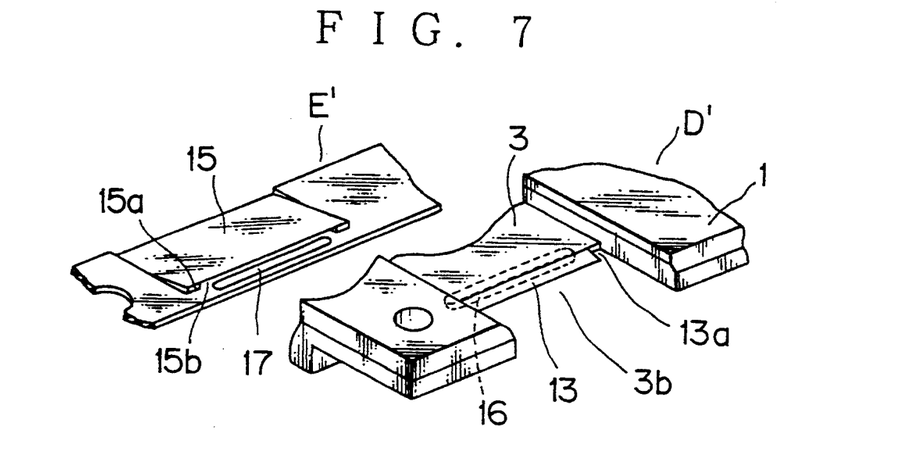
FIG. 7 is a perspective view of essential portions of the L-shaped fixture and water-proof packing.

A bent upright plate part 1' is provided at one side of the main plate part 1 of the L-shaped fixture D', a connector through hole 2' is formed and the arc-shaped weather strip guideway 3 is provided on the main plate part 1, cutaway parts 3b, 3b are formed on the main plate part 1 at both ends of the weather strip guideway 3, and tapered engaging members 13, 13 are formed with separating slits 13a provided at both sides in the cutaway parts 3b, 3b.

The water-proof packing E' made of a semi-continuous foamed sealing material is integrally provided with bent parts 14a, 14a at its both free ends of the approximately U-shaped main body part 14 along the upright plate part 1' and a tapered abutment part 15, which declines from the internal protruded part 15a to the outside is formed at a portion corresponding to the weather strip guideway 3 of the main body 14, an engaging recess 15b is formed on the internal upright end surface of the raised part 15a, and the upper wall 15c of the engaging recess 15b is formed to be thinner toward the inside.

Fitting holes 7 and 7' are formed at corresponding positions of the L-shaped fixture D' and the water-proof packing E'.

In the above arrangement, the water-proof packing E' is forced to contact the internal surface of the L-shaped fixture D' and the engaging recesses 15b, 15b provided on the end faces of the raised parts 15a, 15a are engaged with the tapered engaging members 13, 13 in the cutaway parts 3b, 3b, thereby these members being coupled without using a bond. In this case, a transversal protrusion 16 provided on the rear surface of the guideway 3 of the main plate part 1 engages with a transversal through hole 17 formed near the raised part 15a of the main plate part 14 whereby the water-proof packing E' is prevented from coming out when the door is closed and the weather strip J is compressed accordingly. (see FIG. 8).

Figure 8:
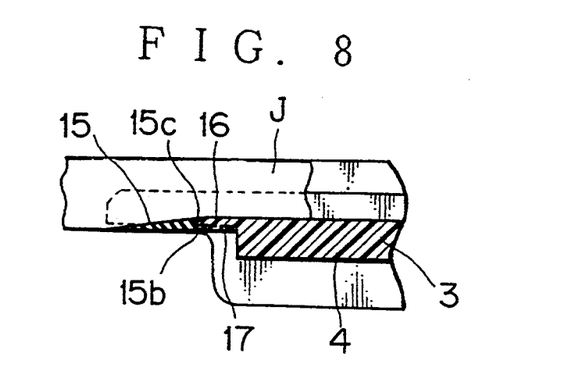
FIG. 8 is a sectional view showing the essential portions coupled.

In the above arrangement of the assembly, a continuous smooth surface is formed across the weather strip guideway 3 of the L-shaped fixture D' to the weather strip abutment part 15 of the water-proof packing E' when a pressure is applied to the weather strip J.

Figure 9:
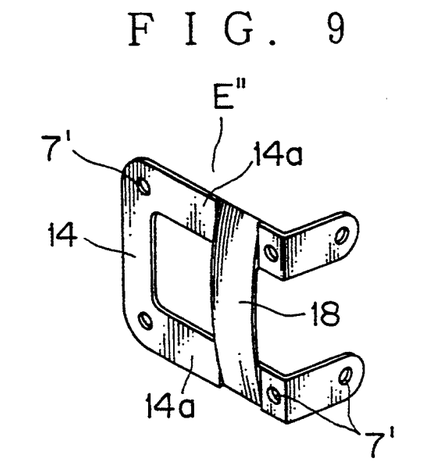
FIG. 9 is a perspective view showing another structure of the water-proof packing.
Figure 10:
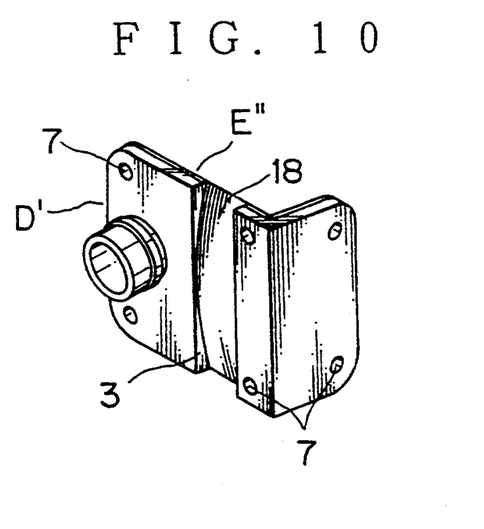
FIG. 10 is a perspective view of the water-proof packing coupled to the L-shaped fixture.

In the case of the water-proof packing E" shown in FIG. 9, an arc-shaped weather strip abutment member 18 which connects opposing members 14a, 14a is integrally formed at a part of the main body part 14 corresponding to the weather strip guideway 3 and the water-proof packing E" is combined with the L-shaped fixture D' while the weather strip abutment member 18 is positioned in the weather strip guideway 3 of the L-shaped fixture D' while the weather strip abutment member is being stretched (FIG. 10).

With this construction, adhesion of the weather strip J to the water-proof packing E" is improved and complete water proofing can be ensured.

In FIGS. 11 to 14, the L-shaped recess (see FIG. 1) is not provided on the side plate part A1' and the inner plate part A2' of the door frame A'. Therefore the fixture D" is non-L-shaped and comprises a flat fitting plate part 1".

Figure 11:
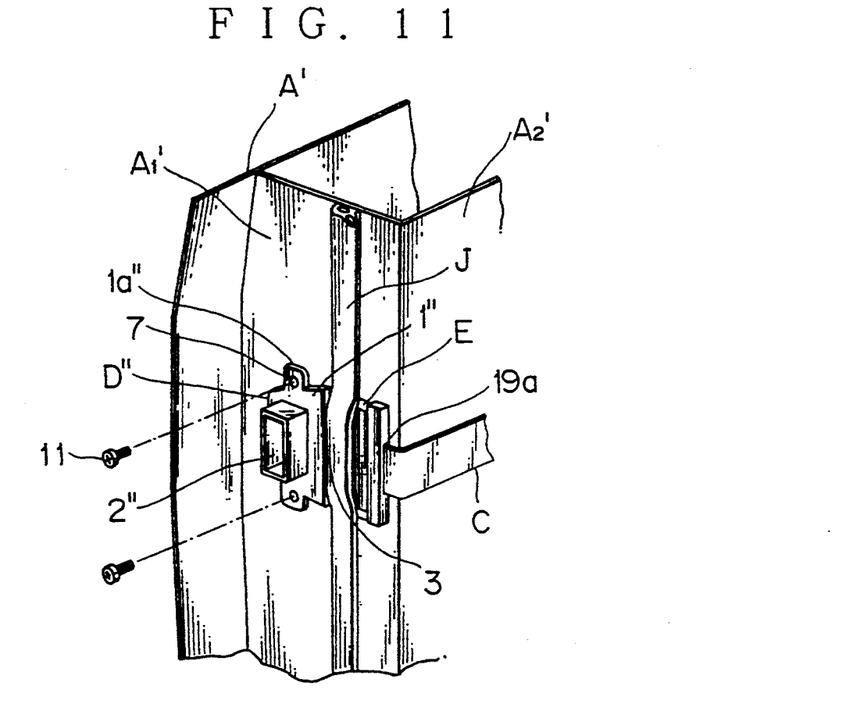
FIG. 11 is a perspective view of another fixture after installation.
Figure 12:
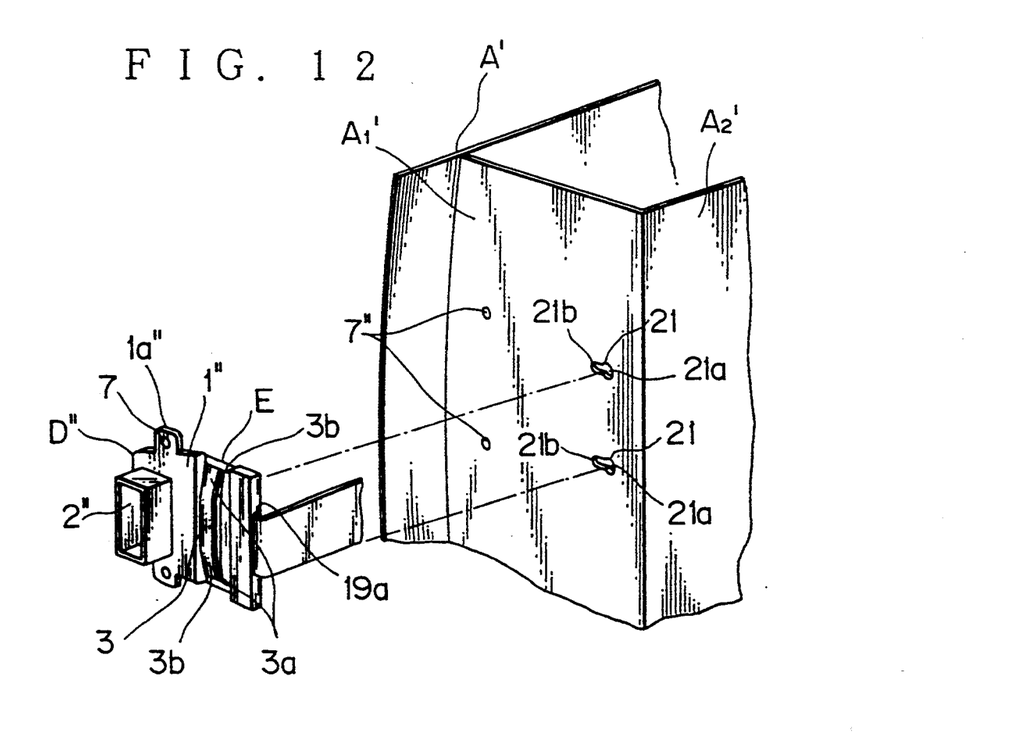
FIG. 12 is a perspective view of the fixture before installation.
Figure 13:
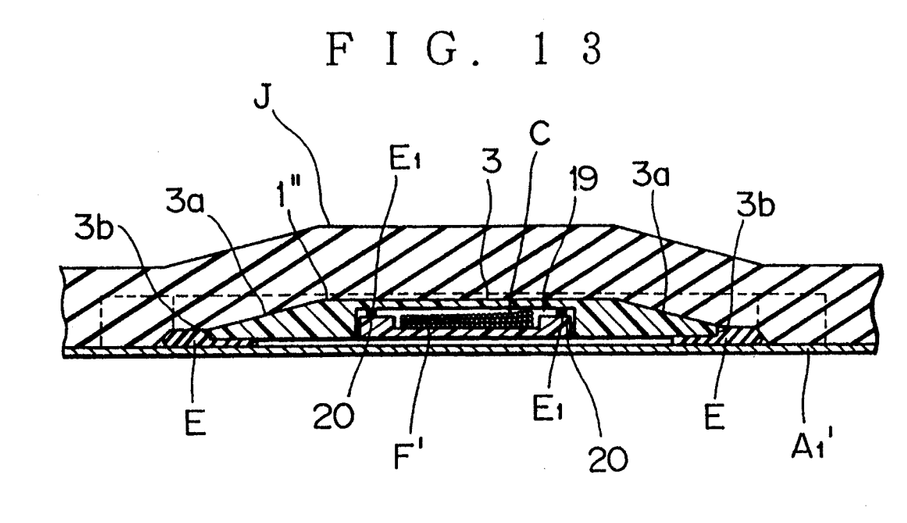
FIG. 13 is a sectional view of the fixture installed.

The fitting plate part 1" is provided with a connector through hole 2" and the weather strip guideway 3 is provided on the surface of the fitting plate part. Tapered abutment parts 3a, 3a are formed at both sides of the weather strip guideway 3 and cutaway parts 3b, 3b are provided outside the tapered abutment parts 3a, 3a.

Figure 14:
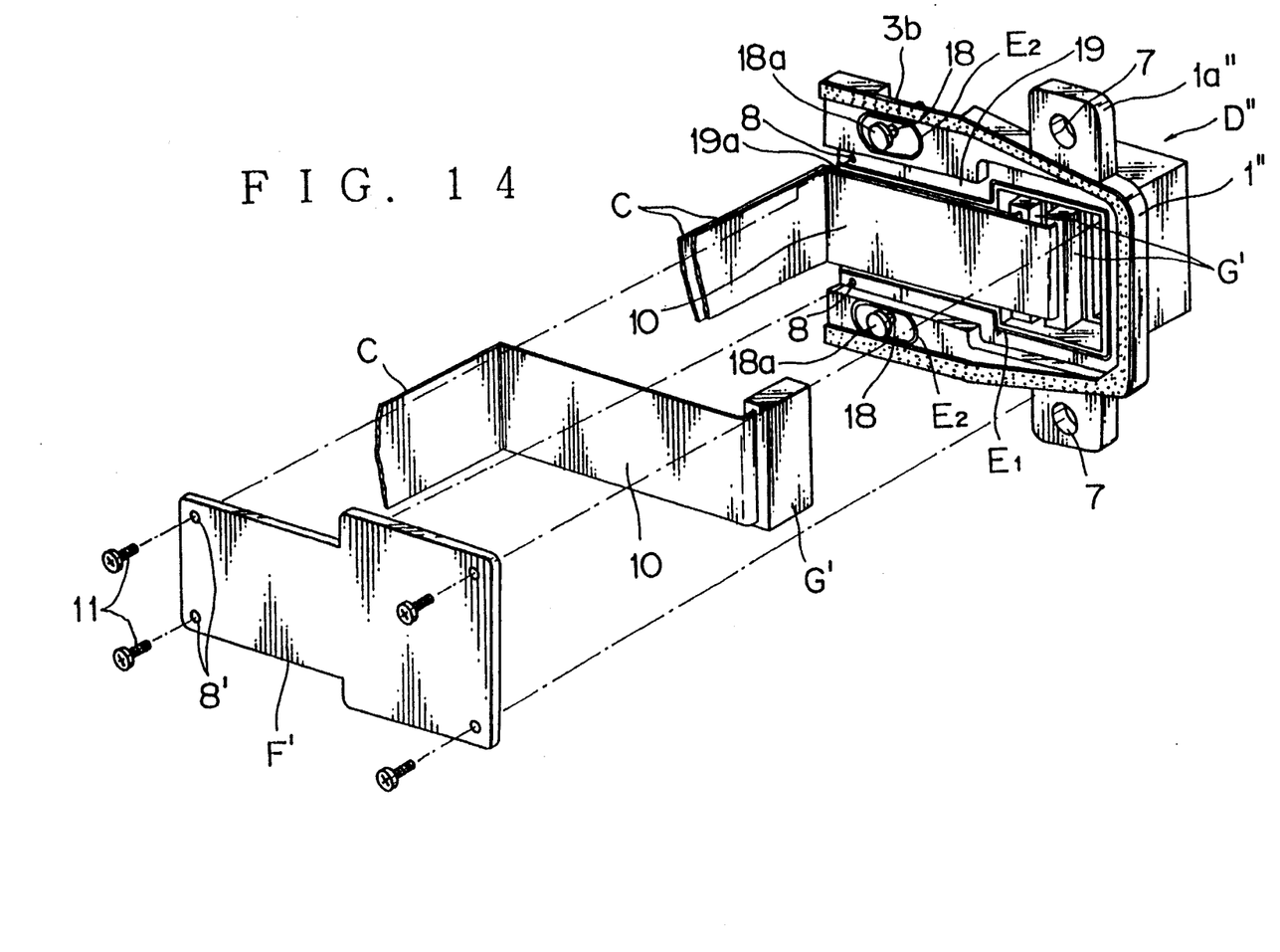
FIG. 14 is an exploded perspective view of the fixture.

A fitting lug 1a" provided with a fitting hole 7 is provided on an outer periphery of the fitting plate part 1" and a temporary engaging projection 18 having a bulged engaging part 18a at its extreme end part is provided at the outer side of the inner surface whereby an accommodating groove 19 for accommodating the door wire harness C which reaches from the connector through hole 2" to the other open end 19a is formed between a pair of temporary engaging projections 18, 18.

The approximately U-shaped water-proof packing E is adhered to the outer periphery of the fitting plate part 1" except for the open end 19a of the accommodating groove 19 and part of the water-proof packing E is positioned facing the cutaway parts 3b, 3b which are formed at both side ends of the weather strip guideway 3.

A sealing material E1 is continuously applied to the outer periphery inside the accommodating groove 19 except for the open end 19a and a sealing material E2 is applied annularly to the periphery of the temporary engaging projection 18 on the internal surface of the fitting plate part 1".

In the above-described construction, the strap part 10 of the door wire harness C extended in the door frame A' is arranged from the open end 19a to the accommodating groove 19 and the main connector G' at the end part is fixed in the through hole 2". Then, the accommodating groove 19 is closed with the under cover F', which is fixed with screws 11 through fitting holes 8, 8'. At this time, a rib 20 which is protruded at the peripheral edge of the under cover F' contacts under pressure with the sealing material E1 to prevent water from entering into the accommodating groove 19 (see FIG. 13).

The fixture D" which has been assembled as described above is arranged in contact with the side plate part A1' of the door frame A', the temporary engaging projection 18 is positioned in a slit 21b of an engaging hole 21 by inserting the temporary engaging projection 18 into an expanded hole portion 21a of the engaging hole 21 (see FIG. 12) and sliding the fitting fixture D" in the outward direction of the door frame A', and the bulged engaging part 18a is engaged with the rear surface of the slit 21b and temporarily fixed. Then the fixture D" is finally fixed with screws 11 to the door frame A' through fitting holes 7, 7" which have been temporarily aligned. In this case, the water-proof packing E contacts under pressure with the door frame A' and primarily prevents ingress of external water into the inside of the fixture D".

Figure 3:
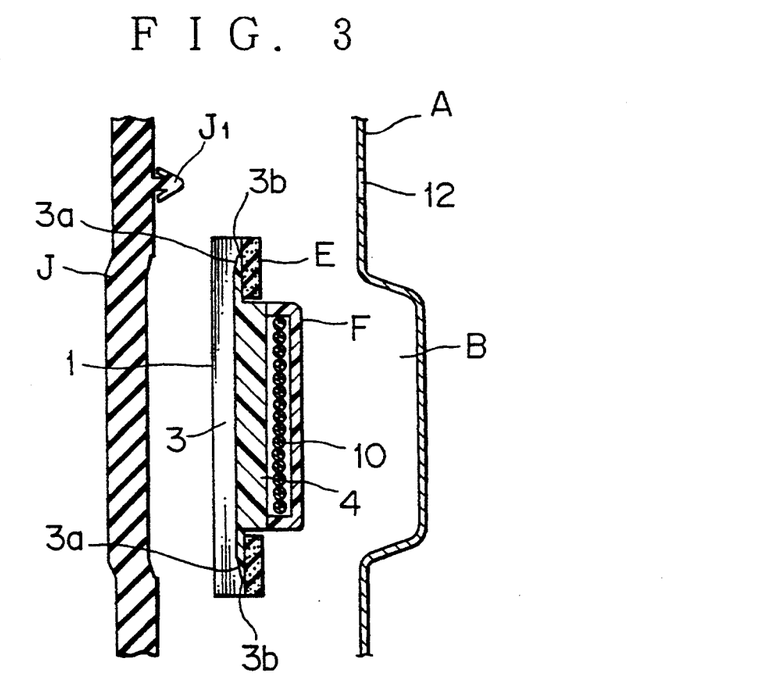
FIG. 3 is a sectional view of the L-shaped fixture part before installation.

Subsequently, the weather strip J is arranged on the fixture D" while being positioned in the weather strip guideway 3 and fixed, as shown in FIG. 3, by fitting the clamp to the fitting hole of the door frame A'. When the door is closed, the weather strip g receives a pressure to depress the water-proof packing E which is bulged from the tapered abutment part 3a of the weather strip guideway 3 whereby the water-proof packing E is disposed to eliminate the clearance in the range from the tapered abutment part 3a to the surface of the door frame A' (see FIG. 13).

Figure 15:
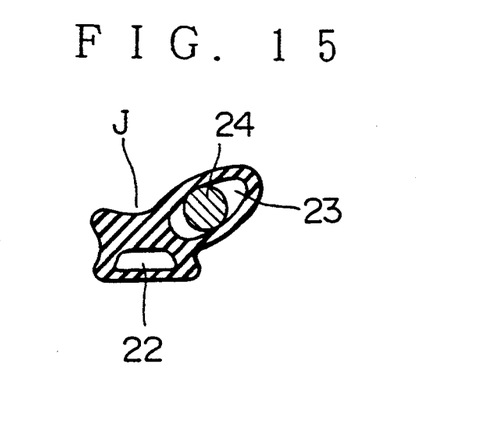
FIG. 15 is a sectional view of a weather strip.

As shown in FIG. 15, in two independent hollow chambers 22 and 23 of the weather strip J, a rod type cushion member 24 containing a sponge buffer is accommodated in the outer hollow chamber 23 to prevent a fall of the contact pressure load due to deterioration of the weather strip J.

In a first aspect of the invention, the water-proof packing is filled in a clearance between the L-shaped fixture and the L-shaped recess and between the weather strip and the L-shaped fixture to the door frame to shut off ingress of water into the vehicle cabin. The side plate part and the L-shaped fixture are structured to closely contact each other and therefore water proofing by the L-shaped fixture can be easily attained without depending on the press-molded shape of the L-shaped recess on the side plate part of the door frame.

In a second aspect of the invention, the above-described object can be attained without adhering in advance the water-proof packing to the L-shaped fixture.

In a third aspect of the invention, the water-proof effect of the water-proof packing can be further improved.

In a fourth aspect of the invention, the door wire harness can be drawn out by the fixture without forming the L-shaped recess and the water-proof effect between the weather strip and the fixture to the door frame can be ensured.

In a fifth aspect of the invention, a fall of the contact pressure load due to deterioration of the weather strip can be prevented.

What is claimed is:

1. A water-proof structure for an automobile door comprising:
    an L-shaped recess which is formed across a side plate part to an inner plate part at a hinge fitting side of a door frame of an automobile;
    a connector through hole which is formed in a main plate part of an L-shaped fixture which covers said L-shaped recess; and
    a weather strip guideway which is formed on the surface of said main plate part;
    wherein said weather strip guideway is provided with a cutaway part and a tapered abutment part, which terminates in said cutaway part, at its both ends, said main plate part is provided with a water-proof packing on a periphery of its internal surface, part of said water-proof packing is disposed to face said cutaway part, a weather strip is arranged from the weather strip guideway of said L-shaped fixture, which is fixed to the door frame, onto the door frame whereby said water-proof packing, which is compressed when the door of the vehicle is closed, serves to fill a clearance between said weather strip and said L-shaped fixture and the door frame.

2. A water-proof structure for an automobile door according to claim 1, wherein a rod type cushion member is incorporated in a hollow chamber of said weather strip.

3. A water-proof structure for an automobile door comprising:

an L-shaped recess which is formed across a side plate part to an inner plate part at a hinge fitting side of a door frame of an automobile;

a connector through hole which is formed in a main plate part of an L-shaped fixture which covers said L-shaped recess; and a weather strip guideway which is formed on the surface of said main plate part;

wherein said weather strip guideway is provided with a cutaway part and a tapered engaging member, which terminates in said cutaway part, at its both ends, said main plate part is provided with a water-proof packing on a periphery of its internal surface, a tapered abutment part, which declines from an internal raised part formed on said water-proof packing toward outside, is disposed to face said cutaway part to cause an engaging recess formed on an end surface of said raised part to be engaged with said tapered engaging member, and a weather strip is arranged from the weather strip guideway of said L-shaped fixture, which is fixed to the door frame, onto the door frame whereby said water-proof packing, which is compressed when the door of the vehicle is closed, serves to fill a clearance between said weather strip and said L-shaped fixture and the door frame.

4. A water-proof structure for an automobile door according to claim 3, wherein a rod type cushion member is incorporated in a hollow chamber of said weather strip.

5. A water-proof structure for an automobile door comprising:

an L-shaped recess which is formed across a side plate part to an inner plate part at a hinge fitting side of a door frame of an automobile;

a connector through hole which is formed in a main plate part of an L-shaped fixture which covers said L-shaped recess; and a weather strip guideway which is formed on the surface of said main plate part;

said weather strip guideway being provided with a cutaway part at its both ends and said main plate part being provided with a water-proof packing on the periphery of its internal surface;

wherein an arc-shaped weather strip abutment member is continuously formed on said water-proof packing and said water-proof packing is coupled to said L-shaped fixture to position said weather strip abutment member in said weather strip guideway.

6. A water-proof structure for an automobile door according to claim 5, wherein a rod type cushion member is incorporated in a hollow chamber of said weather strip.

7. A water-proof structure for an automobile door comprising:

a connector through hole which is provided in a fitting plate part of a fixture;

an accommodating groove which is provided on the internal surface of said fitting plate part to reach from said connector through hole to an open end;

an under cover which is fixed in said accommodating groove while a strap part of a door wire harness is accommodated in said accommodating groove; and a weather strip guideway which is formed on the surface of said fitting plate part;

wherein a cutaway part and a tapered abutment part, which terminates at said cutaway part, are provided at both ends of said weather strip guideway, a water-proof packing is provided on the periphery of the internal surface of said fitting plate part, part of said water-proof packing is disposed to face said cutaway part, and a weather strip is arranged from said weather strip guideway of said fixture, which is fixed to the door frame, onto the door frame whereby said water-proof packing, which is compressed when the door of the vehicle is closed, serves to fill a clearance between said weather strip and said fixture and the door frame.

8. A water-proof structure for an automobile door according to claim 7, wherein a rod type cushion member is incorporated in a hollow chamber of said weather strip.

* * * * *